Patented June 26, 1951

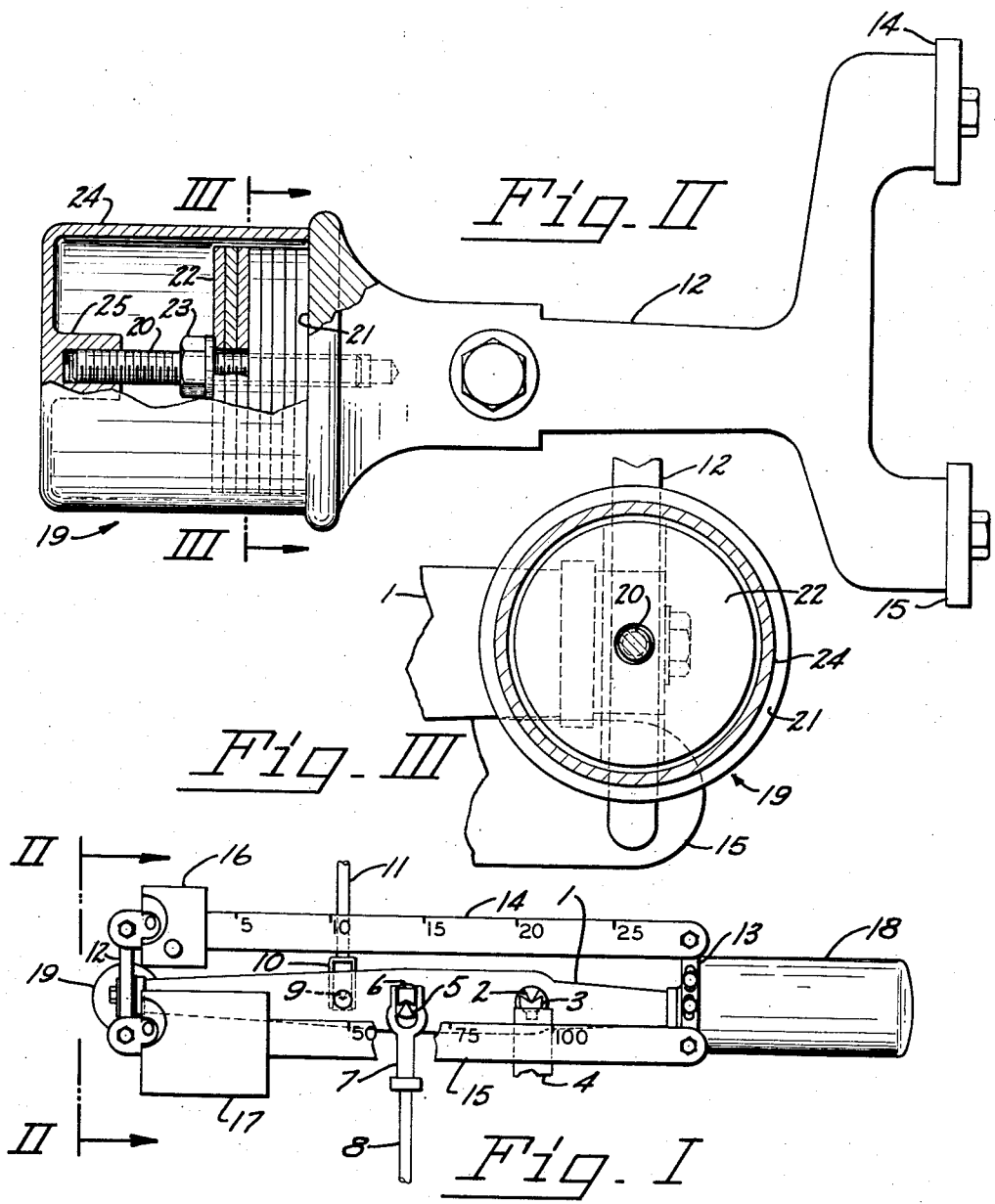

2,558,136

UNITED STATES PATENT OFFICE 2,558,136

ADJUSTABLE BACK BALANCE WEIGHT

Norman E. Hart, Toledo, Ohio, assignor to Toledo Scale Company, Toledo, Ohio, a corporation of New Jersey Application December 16, 1949, Serial No. 133,459

3 Claims. (Cl. 265—49)

This invention relates to weighing scales and in particlar to a balance weight construction that is simple to manufacture and that simplifies the operation of adjusting a scale after installation.

It is necessary in the construction of a weighing scale to provide some means for compensating for manufacturing tolerances resulting in differences in weight of levers and platforms so that the completely assembled scale may be adjusted for correct weighing. It has been the usual practice to provide loaded balancing weights for one or more levers of a scale and then during the adjusting procedure to drill out or otherwise remove portions of the lead from the balancing weights to secure the correct balance. This method has a disadvantage that a considerable part of the lead employed in loading the boxes is wasted, and that it is extremely difficult to replace any of the lead, should too much be removed, without spoiling the lacquer finish on the outside of the balancing weight. This follows since the customary method of adding weight by melting the required amount of lead and pouring it into the balancing weight produces enough heat to spoil the lacquer finish on the balance weight casing.

The principal object of this invention is to provide a simple balancing weight for a weighing scale lever.

Another object of the invention is to provide an easily adjusted weight employing a minimum of lead and that being in a readily usable form so that it is not lost during the adjustment of the scale.

More specific objects and advantages are apparent from the following description of a preferred embodiment of the invention.

According to the invention the improved balancing weight comprises a stud extending laterally from an end of the lever and lying in the pivot plane of the lever, a plurality of weights mounted on the stud, and a cup-like casing or housing fitting over the weights and threaded onto the stud.

The improved balancing weight is illustrated in the accompanying drawings.

In the drawings:

Figure I is a front elevation with parts broken away of a weighing scale lever carrying a balancing weight constructed according to the invention.

Figure II is an enlarged end elevation, partly in section, as seen from the line II—II of Figure I.

Figure III is an enlarged vertical section taken substantially along the line III—III of Figure II.

These specific figures and the accompanying description are intended merely to illustrate the invention but not to impose limitations on the claims.

A weighing scale lever assembly constructed to embody the invention includes a lever 1 having a fulcrum knife edge 2 resting on a fulcrum V-bearing 3 of a pedestal 4. The lever 1 is provided with a load pivot 5 to receive a V-bearing 6 carried in a stirrup 7 attached to the upper end of a steelyard rod 8 which in turn is connected to a lever system supporting a load receiver. Forces from the lever 1 are transmitted through a power pivot 9 and stirrup 10 to a second steelyard rod 11 leading to load counterbalancing and indicating mechanism. The lever 1 also carries end brackets 12 and 13 to which a tare beam 14 and a capacity beam 15 are attached. The tare beam 14 carries a small poise 16 while the capacity beam carries a large poise 17.

Load counterbalancing and indicating mechanisms are, for convenience, usually constructed to have a certain more or less fixed initial pull—the pull required to bring the indicating mechanism to zero indication—and an adjustable counterbalancing capacity. When a series of scales are to be built with different capacities and each employing the same design of counterbalancing mechanism it is necessary to provide balancing weights 18 and 19 for the lever in order to match the initial pull of the particular lever system, as applied through the steelyard rod 8, to the initial pull of the counterbalancing mechanism carrying the steelyard rod 11.

It has been common practice to supply a weight corresponding to the balancing weight 19 equal to the heaviest weight ever required at this position and to then adjust the weight of the balancing weight 18 to balance the particular lever combination then in use. This practice is wasteful of material because often both of the balancing weights 18 and 19, one on either side of the fulcrum axis of the lever, are heavier than necessary and merely counteract each other. This procedure of loading the balance weight corresponding to the weight 19 to its maximum capacity has been followed because of the difficulty of adding and securing lead to the weight without marring the weight itself.

According to the invention the weight 19, as seen in Figure II, comprises a stud 20 threaded into the center of a circular rear face 21 of the lever bracket 12. A plurality of washers 22 made of lead or other heavy material are stacked on the stud 20 and secured in place by a nut 23. The stack of washers 22 is covered by a cup-like cap 24 having in its bottom a threaded boss 25 to receive the end of the stud 20 to hold the cap against the flat circular face 21 of the bracket 12.

This assembly is very easy to adjust either in the factory or in the field because washers may be added or removed as required and if a change in weight less than that produced by a single washer is required the washer may be easily cut with either a knife or tin snips to secure the exact weight.

This type of balance weight makes possible an interchangeability between lever systems and load counterbalancing mechanisms heretofore unobtainable. In the manufacture of a line of scales the maximum variation encountered between individual assemblies of a particular lever design is determined and enough lead washers 22 are included to adjust for the maximum variation. Then the load counterbalancing mechanism is adjusted to operate correctly with a load receiver system having the minimum initial pull to be expected. When a scale is ordered a load receiver system and a load counterbalancing mechanism are taken at random from stock and shipped to the customer. The service man installs and connects the lever system to the load counterbalancing mechanism and removes enough of the lead washers 22 to get the scale to indicate correctly at zero. He will always have to remove washers rather than add additional weight because the lever and weight was adjusted at the factory for the minimum initial pull ever expected for the particular design of load receiver and lever assembly. The lead washers that are removed by the service man may be either retained in his stock of parts or returned to the factory for assembly in other scales.

The improved back balance weight, the weight 19, because of its ease of adjustment in the field, makes it possible to load the balance weight 18 during manufacture of the scale to the precise weight required for average conditions. There is seldom any occasion to make any change in the balance weight 18 after the scale is installed and thus there is a minimum of lead employed in the scale consistent with ease of adjustment at the time of installation.

Various modifications in the construction of the balancing weight may be made without departing from the spirit and scope of the invention.

I claim:

1. In a weighing scale having a lever that is weighted as required to match the initial load force of a lever system to the initial load requirements of a counterbalancing mechanism, in combination, a lever, pivots on the lever for supporting the lever and for transmitting forces to and from the lever, said pivots being spaced along the lever with their pivot edges lying in a pivot plane, a bracket mounted at an end of the lever, a stud extending from the bracket and lying in the pivot plane, a plurality of removable washers mounted on the stud, and a cup that fits over the washers and that is threaded onto said stud.

2. In a weighing scale having a lever that is included in the force transmission path between a load receiver and a load counterbalancing mechanism, the lever having a plurality of pivots for supporting the lever and transmitting force to and from the lever and together defining a pivot plane, in combination, a stud carried by the lever and lying in the pivot plane, a plurality of removable washers mounted on the stud, and a cup-shaped cover fitted over the washers and threaded onto the stud.

3. In a weighing scale having a lever that is included in the force transmission path between a load receiver and a load counterbalancing mechanism, the lever having a plurality of pivots for supporting the lever and transmitting force to and from the lever and together defining a pivot plane, in combination, a bracket on the end of the lever, a stud extending from the bracket in the pivot plane of the lever, a plurality of removable washers mounted on the stud, said washers being sufficient in mass to counterbalance the maximum variation in force between similar lever systems resulting from variations in manufacture, and a cup-shaped cover having a threaded boss that engages the stud when the cover encloses the washers.

NORMAN E. HART.

No references cited.